United States Patent [19]
Wilson

[11] Patent Number: 4,648,579
[45] Date of Patent: Mar. 10, 1987

[54] CUSHIONED MOUNTING ARRANGEMENT FOR A MOTOR HOUSING

[76] Inventor: John D. Wilson, 79189 Terretorial Hwy., Lorane, Oreg. 97451

[21] Appl. No.: 742,941

[22] Filed: Jun. 10, 1985

[51] Int. Cl.⁴ .............................................. F16M 3/00
[52] U.S. Cl. .................................... 248/638; 248/566; 310/51
[58] Field of Search ............... 248/638, 637, 674, 560, 248/566, 634, 635, 615, 605, 606, 632, 611; 310/51

[56] References Cited

U.S. PATENT DOCUMENTS

| | | | |
|---|---|---|---|
| 2,508,641 | 5/1950 | Heintz | 248/606 |
| 2,699,567 | 1/1955 | Kramcsak | 248/615 X |
| 3,330,515 | 7/1967 | Janssen et al. | 248/606 |
| 3,463,951 | 8/1969 | Bauerle et al. | 310/51 |
| 3,906,264 | 9/1975 | Kuwako et al. | 310/51 |
| 4,383,679 | 5/1983 | Kakimoto | 248/634 X |
| 4,452,417 | 6/1984 | Krafthefer et al. | 248/635 X |
| 4,520,987 | 6/1985 | Eguchi et al. | 248/638 X |

Primary Examiner—Ramon O. Ramirez
Attorney, Agent, or Firm—James D. Givnan, Jr.

[57] ABSTRACT

A bracket is mounted to a motor face plate with the bracket having all of its wall surfaces in abutment with elongate resilient cushion members. Reaction of the motor housing to motor output shaft torque loads is cushioned by the resilient members which are non-uniformly compressed by the motor face plate bracket. A wall structure with right angular wall components carries the yieldably supported face plate bracket and cushion members.

3 Claims, 2 Drawing Figures

CUSHIONED MOUNTING ARRANGEMENT FOR A MOTOR HOUSING

BACKGROUND OF THE INVENTION

The present invention relates generally to motor mounts for hydraulic and electric motors and particularly to such a mount wherein operational loads on the motor are cushioned.

Substantial forces are imparted to motor housings and mounts as the motor reacts to output shaft torque loads. This is particularly so where the motor housing is secured in place by a housing face end plate. Shear loads are imparted to the fasteners coupling the face plate to the supporting surface. Further it is not uncommon for the face plate of a motor housing to crack and fail from metal fatigue. The problem is accentuated in industrial reversible motors used to rotate grapples into position for load discharge or pick-up. The refurbishing of the motor housing and down time of the grapple contribute to such repairs being costly.

SUMMARY OF THE PRESENT INVENTION

The present invention is embodied in a heavy duty motor mount which permits a motor housing to move in a restrained manner with resilient components being momentarily compressed to absorb torque loads.

Cushion means isolate a motor attached bracket with the cushion means being non-uniformly compressed as the motor housing shifts in reaction to torque loading of the motor output shaft. The motor attached bracket is confined in a manner permitting slight rotational movement of same in both directions about the motor axis which movement is opposed by mount cushion members. A retainer prevents axial displacement of the motor along a motor axis. Wear surfaces of the motor mount may be of the replaceable type. Similarly, the cushion means may be in the form of replaceable elastomeric members.

Important objectives of the present invention include the provision of a motor mount which cushions a motor housing as it is rotationally displaced in reaction to output shaft loads; the provision of a motor mount which includes unitary or separate resilient members which jointly contribute to resiliently supporting a motor attached bracket against rotation during motor operation; the provision of a motor mount which may be refurbished from time to time in an economical manner while preventing costly repairs and equipment down time because of motor housing metal fatigue and damage; the provision of a motor mount having relatively large surface areas which abut cushioning means and distribute compression loads to the longlived resilient cushioning means in a non-damaging manner.

DETAILED DESCRIPTION OF THE PREFERRED EMBODIMENT

Figure 1:
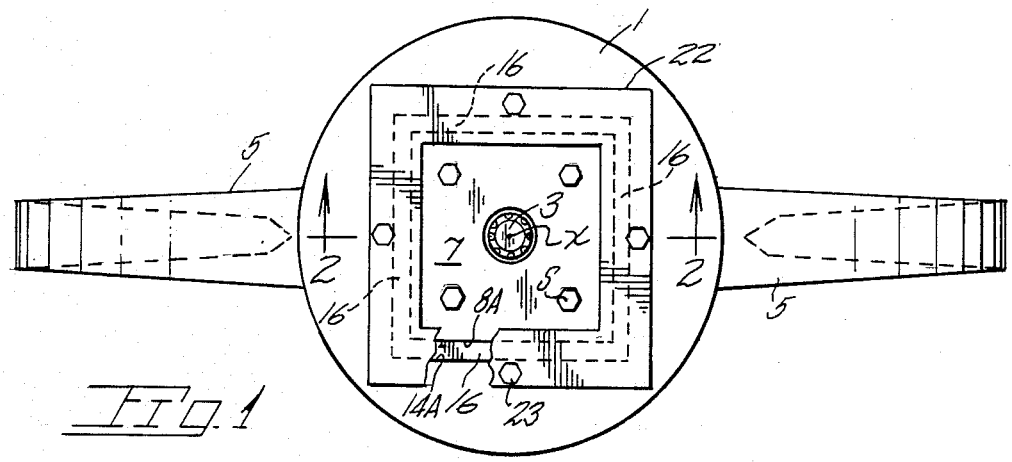
FIG. 1 is a plan view of the present motor mount.
Figure 2:
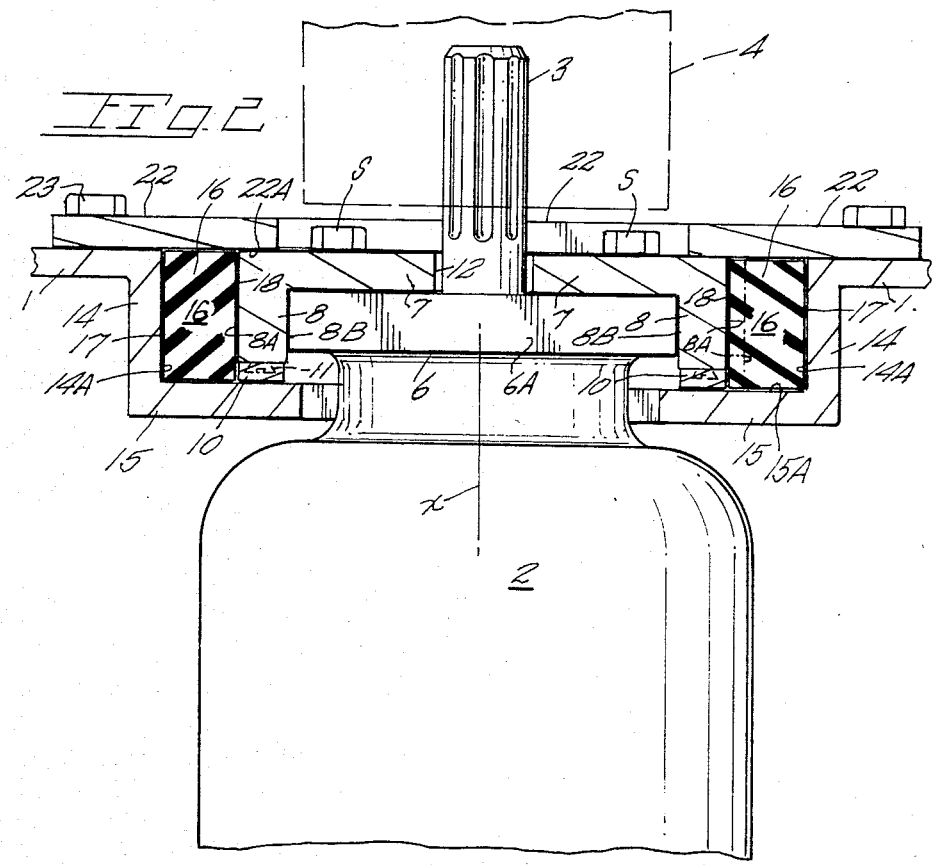
FIG. 2 is a vertical, sectional view thereof taken along line 2—2 of FIG. 1.

With continuing attention to the drawing, the reference numeral 1 indicates a base which may be stationary or moveable. A motor at 2 has an output shaft 3 in splined engagement with a fixed socket structure 4. Base 1 is accordingly positionable about a motor axis x during motor operation. Base 1 may support an instrumentality such as a grapple 5.

A motor housing face plate at 6 serves to receive mounting screws S which additionally pass through a bracket 7. A parametrical bracket flange is at 8 having wall surface 8A. A wear ring at 10 may be installed about the flange in a replaceable manner as by recessed screws 11. A central opening 12 in the bracket receives motor output shaft 3. The face plate 6 is preferably in abutment with the inner wall surfaces 8B of flange 8.

Base 1 includes a wall structure comprised of perpendicularly or right angularly orientated walls 14 and 15 which provide a polygonal frame which defines a motor mount receiving area within which the motor bracket 7 and later described cushioning means are confined. In place along said perpendicularly oriented walls are cushioning means 16 having outer and inner wall surfaces 17 and 18 which are in surfacial contact respectively with bracket surfaces 8A and wall surfaces 14A.

A frame-like retainer 22 is mounted on base 1 by means of fasteners 23. A surface 22A of the retainer surfacially overlies bracket 7 in a non-biasing manner. Oppositely a surface 15A of the wall 15 supports said bracket. Accordingly the motor bracket is closely confined permitting limited arcuate movement of the motor face plate 6 in a plane normal to motor output shaft axis x and resulting in non-uniform compression of cushioning means 16.

Motor face plate 6 is typically of polygonal shape with sides 6A being in surface abutment with motor bracket 7. A torque load on motor shaft 3 will impart reaction movement to face plate 6 to cause its sides 6A and bracket 7 to be displaced about axis x causing uneven compression of cushioning means 16. Said cushioning means may be embodied within a molded member or separate elongate blocks of resilient material such as neoprene rubber of a suitable hardness rating. The present motor mount arrangement also reduces damage to splines, keyways and keys to contribute to reduced failure of such components.

While I have shown but one embodiment of the invention, it will be apparent to those skilled in the art that the invention may be embodied still otherwise without departing from the spirit and scope of the invention.

Having thus described the invention, what is claimed and desired to be secured in Letters Patent is:

1. In combination a motor mount and a motor housing, said motor mount providing for the cushioning of a motor housing and face plate thereon against operational loads in reaction to output shaft torque, said motor housing receiving a motor output shaft, said mount comprising, wall structure having perpendicularly oriented walls defining a motor mount area concentric with the motor output shaft, bracket means for attachment about one end of the motor housing and having wall surfaces in said motor mount area and inwardly offset from and parallel to certain of said perpendicularly oriented walls, said bracket means in movable rested engagement with said wall structure and including a wear ring, and cushioning means including elongate resilient members located in said area between said bracket means and said certain perpendicularly oriented walls which members may compress upon arcuate displacement of said bracket means in response to output shaft loads to cushion the motor housing against reaction to motor output shaft loads.

2. A mounting arrangement for an electric motor having a housing and an output shaft which permits cushioned displacement of the motor housing in reaction to motor output shaft loads, said mounting arrangement comprising, a polygonal wall structure defining an area concentric with the motor output shaft, a motor bracket movably disposed within said area and in rested engagement with said wall structure, cushioning means disposed within said area between said motor bracket and said wall structure, and said motor bracket having wall surfaces arcuately displaced in reaction to the motor output shaft torque with said wall surface displacement opposed by a non-uniform compression of said cushioning means.

3. The motor mounting arrangement claimed in claim 2 wherein a retainer detachably mounted on said wall structure and additionally defines said area and serves to prevent axial displacement of the motor housing while permitting arcuate housing displacement about the axis.

* * * * *